(12) United States Patent
Petitjean et al.

(10) Patent No.: US 7,753,591 B2
(45) Date of Patent: Jul. 13, 2010

(54) TURBOCHARGER BEARING AND ASSOCIATED COMPONENTS

(75) Inventors: Dominque Petitjean, Julienrupt (FR); Phillipe Arnold, Henncourt (FR); Anthony Ruquart, Epinal (FR)

(73) Assignee: Honeywell International Inc., Morristown, NJ ( * ) Notice: Subject to any disclaimer, the term of this patent is extended or adjusted under 35 U.S.C. 154(b) by 982 days.

(21) Appl. No.: 11/172,670

(22) Filed: Jun. 30, 2005

(65) Prior Publication Data

US 2007/0003175 A1 Jan. 4, 2007

(51) Int. Cl.
*F16C 1/24* (2006.01)
*F04B 17/00* (2006.01)

(52) U.S. Cl. .................. 384/397; 384/906; 417/407
(58) Field of Classification Search .................. 384/99, 384/112, 113, 322, 368, 369, 371, 397–401, 384/901, 906; 415/104–107, 111, 112, 229; 417/365, 407
See application file for complete search history.

(56) References Cited

U.S. PATENT DOCUMENTS

| 4,240,678 | A | | 12/1980 | Sarle et al. | |
|---|---|---|---|---|---|
| 4,256,441 | A | * | 3/1981 | Arora | 417/407 |
| 5,055,009 | A | * | 10/1991 | Gutknecht | 417/407 |
| 5,145,334 | A | | 9/1992 | Gutknecht | |
| 5,890,881 | A | * | 4/1999 | Adeff | 417/407 |
| 6,017,184 | A | * | 1/2000 | Aguilar et al. | 415/112 |
| 6,449,950 | B1 | * | 9/2002 | Allen et al. | 60/607 |
| 6,905,316 | B2 | * | 6/2005 | Parker et al. | 417/407 |
| 7,104,693 | B2 | * | 9/2006 | Mavrosakis | 384/99 |

FOREIGN PATENT DOCUMENTS

| DE | 1526439 | | 2/1970 |
|---|---|---|---|
| EP | 0272151 | | 12/1987 |
| GB | 2062127 | * | 11/1979 |

OTHER PUBLICATIONS

PCT ISRWO.

* cited by examiner

*Primary Examiner*—Thomas R Hannon
*Assistant Examiner*—James Pilkington
(74) *Attorney, Agent, or Firm*—Brian Pangrle (57) ABSTRACT

An exemplary bearing and locating pin system for a turbocharger includes a locating pin including a shaft, a head and an aperture and a bearing having a central axis and including an internal bore to receive a shaft extending between a compressor wheel and a turbine wheel, the internal bore including a plurality of axial grooves, the bearing including a locating pin aperture substantially equidistant from axial ends of the bearing for engaging the locating pin to prevent rotation of the bearing within a bearing case bore, the bearing further including a plurality of lubricant inlets, each inlet extending between an outer surface of the bearing and one of the axial grooves at an angle non-orthogonal to the central axis. Other exemplary technologies are also disclosed.

10 Claims, 7 Drawing Sheets

TURBOCHARGER BEARING AND ASSOCIATED COMPONENTS

FIELD OF THE INVENTION

Subject matter disclosed herein relates generally to bearings for turbochargers and, in particular, to bearings that include passages for flow of lubricant to and from a bore of the bearing.

BACKGROUND

Exhaust gas driven turbochargers include a rotating shaft carrying a turbine wheel and a compressor wheel, which is rotatably supported within a center housing by one or more lubricated bearings (e.g., oil lubricated). The turbine wheel is driven by the exhaust gas at high rotational speeds, often well in excess of 100,000 RPM, to drive the compressor wheel to provide boosted charge air for use by an internal combustion engine.

With respect to lubrication of various bearing surfaces, one approach relies on two distinct lubricant galleries machined in a turbocharger center housing that allow lubricant to flow to radial bearing journals. While this approach provides for reasonable bearing power losses, production issues exist related to machining, deburring, cleaning and quality control of the center housing. Another approach relies on a single lubricant gallery machined in a turbocharger center housing. The single gallery allows lubricant to flow to radial bearing outer journals and bore journals where flow is outward toward the bearing ends only.

The latter single gallery approach is reasonably low cost with respect to machining and related processes for production of the center housing but the bearing power losses are can be high.

A need exists for technology that strikes an appropriate balance between production related costs and performance. As described herein, various exemplary technologies aim to address this need and others needs.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers. Turbochargers are frequently utilized to increase the output of an internal combustion engine. A turbocharger generally acts to extract energy from the exhaust gas and to provide energy to intake air, which may be combined with fuel to form combustion gas. A turbocharger may include a variable geometry mechanism, for example, with features such as those associated with commercially available variable geometry turbochargers (VGTs), such as, but not limited to, the GARRETT® VNT™ and AVNT™ turbochargers, which use multiple adjustable nozzle vanes to control the flow of exhaust across a turbine.

Figure 1:
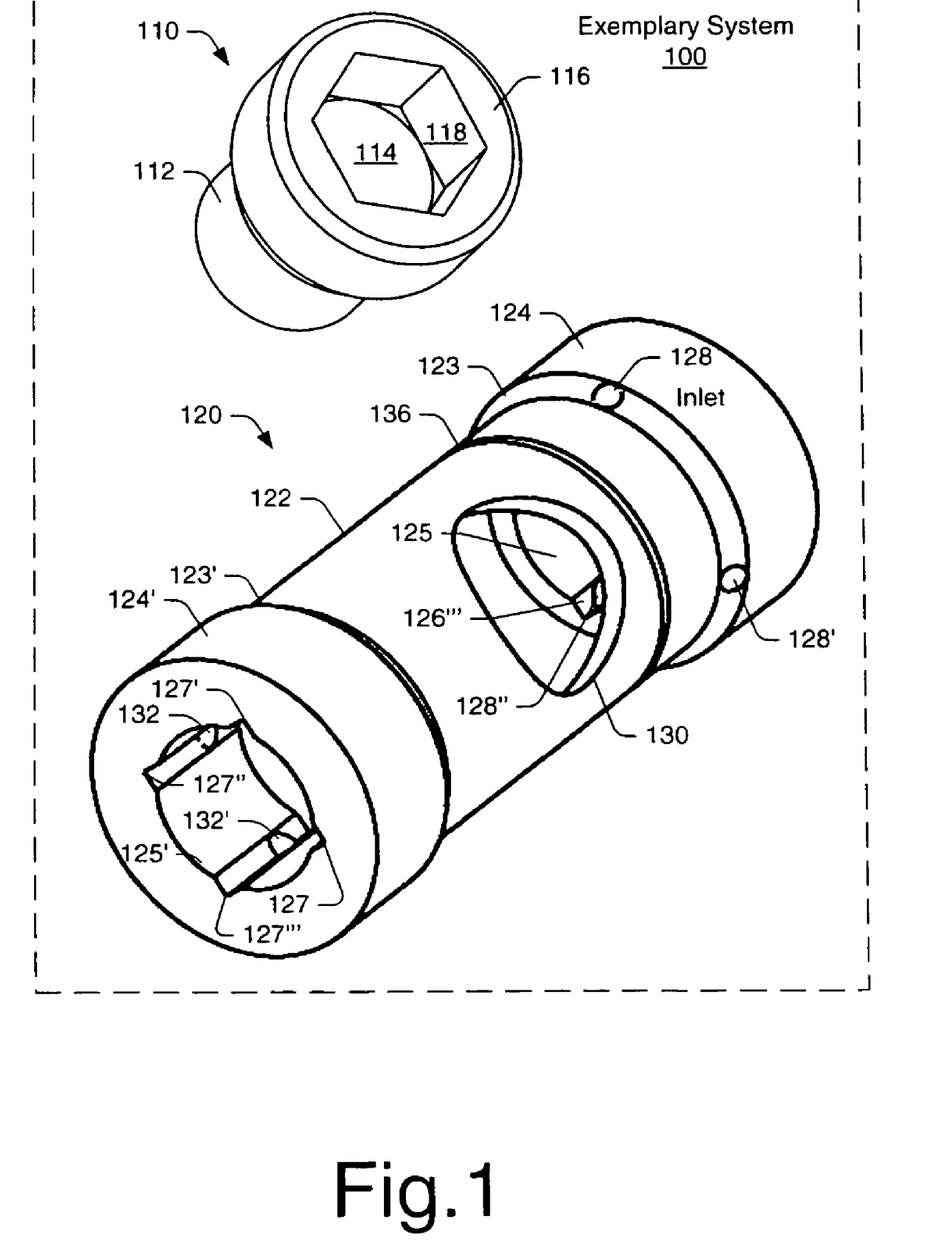
FIG. 1 is a perspective view of an exemplary system that includes an exemplary locating pin and an exemplary bearing.

FIG. 1 shows an exemplary system 100 that includes a locating pin 110 and a bearing 120. The exemplary locating pin 110 acts generally as an anti-rotation component or mechanism and it includes a shaft 112 and a head 116 and an aperture defined by an inner shaft surface 114 and an inner head surface 116 of the pin 110. The aperture provides a passage for flow of lubricant, as described further below. In this example, the inner head surface 118 has a hexagonal shape to receive, for example, a hex wrench. Other shapes may be used as appropriate. In general, the pin 110 includes a feature that allows for rotation or positioning of the pin 110. Other examples may include anti-rotation mechanisms that differ from the specific example shown; however, in general, an exemplary bearing includes a feature or a mechanism that allows for drainage of lubricant from the bore region of a bearing to a drain of a center housing, as described further below.

The exemplary bearing 120 includes a variety of features. Importantly, the bearing 120 includes a pin aperture 130 defined by a wall of the bearing 120. The exemplary system 100 provides for reception of at least a portion of the shaft 112 of the pin 110 by the pin aperture 130 of the bearing 120. The cooperative nature of the pin 110 and the bearing 120 is described in more detail with respect to a center housing of FIG. 2.

The exemplary bearing 120 is a single piece bearing having an internal bore and integral thrust surfaces on opposing ends. The bearing 120 has a central surface 122 that extends axially between two beveled surfaces 123, 123' which, in turn, border journal surfaces 124, 124', respectively. In general, the radius of the central surface 122 is less than the radius of a journal surface.

The internal bore of the exemplary bearing 120 includes internal journal surfaces 125, 125'. In the example of FIG. 1, each of the internal journal surfaces 125, 125' includes four axial grooves, which are labeled 126, 126', 126", 126'" and 127, 127', 127", 127'", respectively. Another, different type of groove 136 is also shown. In general, the axial length of the internal journal surface 125 is approximately equal to the axial length of the journal surface 124 and the axial length of the internal journal surface 125' is approximately equal to the axial length of the journal surface 124'.

The exemplary bearing 120 further includes four lubricant inlets on each of the two beveled surfaces 123, 123'. The four lubricant inlets associated with the beveled surface 123 are labeled 128, 128', 128", 128'" and the four other lubricant inlets associated with the beveled surface 123' are labeled 132, 132', 132", 132'". These inlets are spaced at approximately 90° intervals and each inlet extends from a respective beveled surfaces 123, 123' to a respective axial grooves 126-126'", 127-127'", for example, at a relative angle of approximately 30° to a central axis of the bearing 120.

With respect to lubricant, the inlets receive lubricant and allow such lubricant to flow to a respective axial groove. The axial grooves allow for lubricant distribution along the bore surfaces 125, 125'. The internal bore of the bearing 120 may receive a shaft whereby the lubricant provides a film between the bore surfaces 125, 125' and the shaft. In such an exemplary arrangement, lubricant flows to the lubricant inlets 128-128''', 132-132''', to the grooves 128-128''', 1, and then to a drain via one or more paths, as described in more detail with respect to FIG. 2. The axial grooves 126-126''', 127-127''' additionally provide an enhancement in rotordynamics by improving resistance to subsynchronous shaft motion through reduction of lubricant whirl encountered in lightly loaded bearing conditions.

Figure 2:
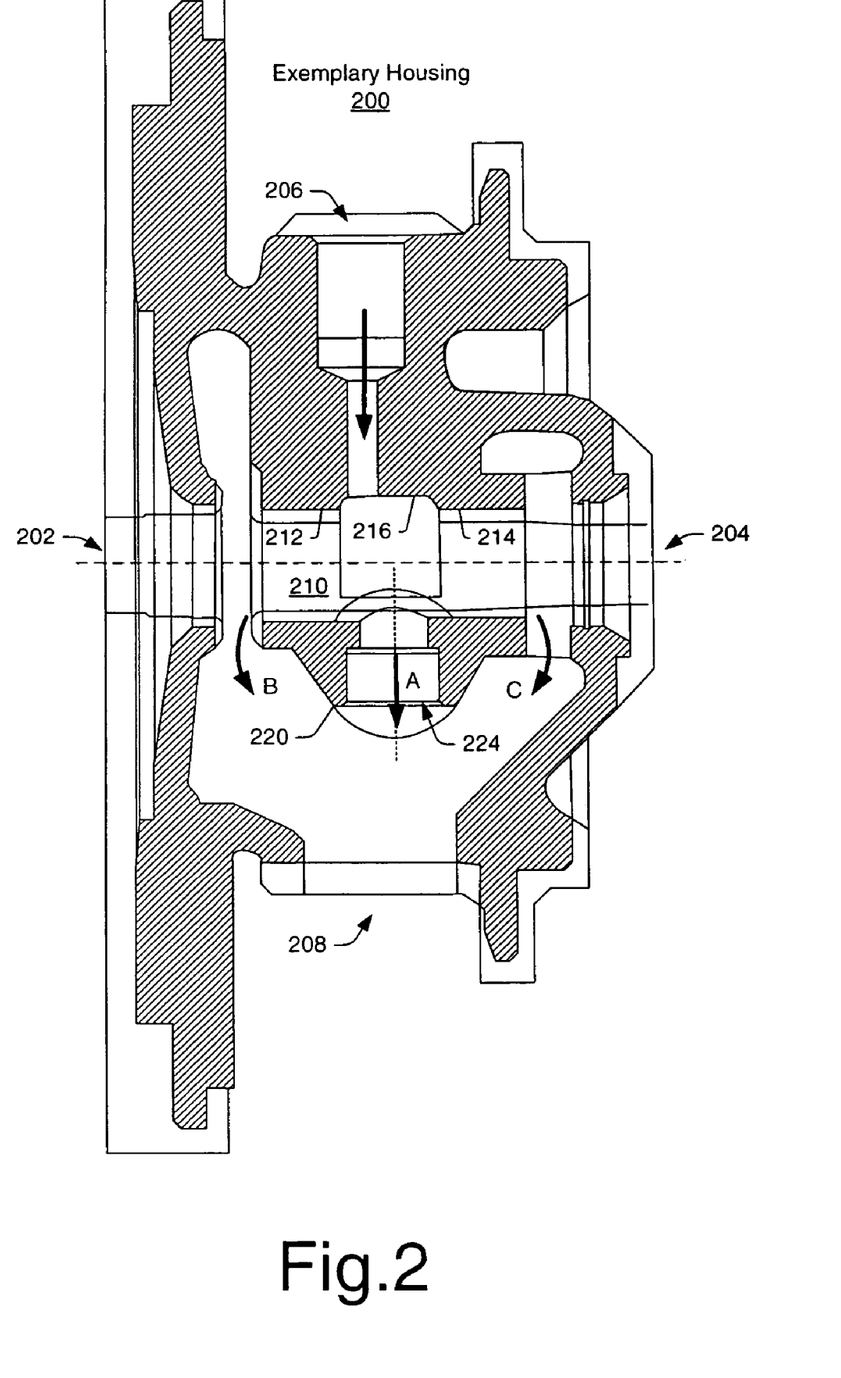
FIG. 2 is a cross-sectional view of an exemplary turbocharger center housing suitable for use with the exemplary system of FIG. 1.

FIG. 2 shows an exemplary housing 200 having a compressor end 202 and a turbine end 204. In this example, the housing 200 is a center housing of a turbocharger assembly and the housing 200 includes a bearing case bore 210 and a boss 220 with an aperture 224 for receiving the exemplary locating pin 110 such that the pin 110 extends into the bearing case bore 210 substantially centrally in the bore 210. In such a manner, the exemplary bearing 120 may be constrained from rotating in the bearing case bore 210 of the center housing 200 by the pin 110 inserted through the aperture 224 in boss 220. As shown in the example of FIG. 2, the bore 210 includes bore surfaces 212, 214 and a lubricant well surface 216.

In general, once arranged in conjunction with the housing 200, the bearing 120 is semi-floating with symmetrical freedom of movement from end to end due to the centrally located pin 110 thereby optimizing the effectiveness of the lubricant-film (e.g., oil-film) damper in the clearance between the bearing outer diameter (e.g., journal surfaces 124, 124') and the case bore 210. Lubricant for the bearing is supplied through an inlet 206 of the housing 200 and lubricant may exit the housing 200 via an exit 208.

Figure 3:
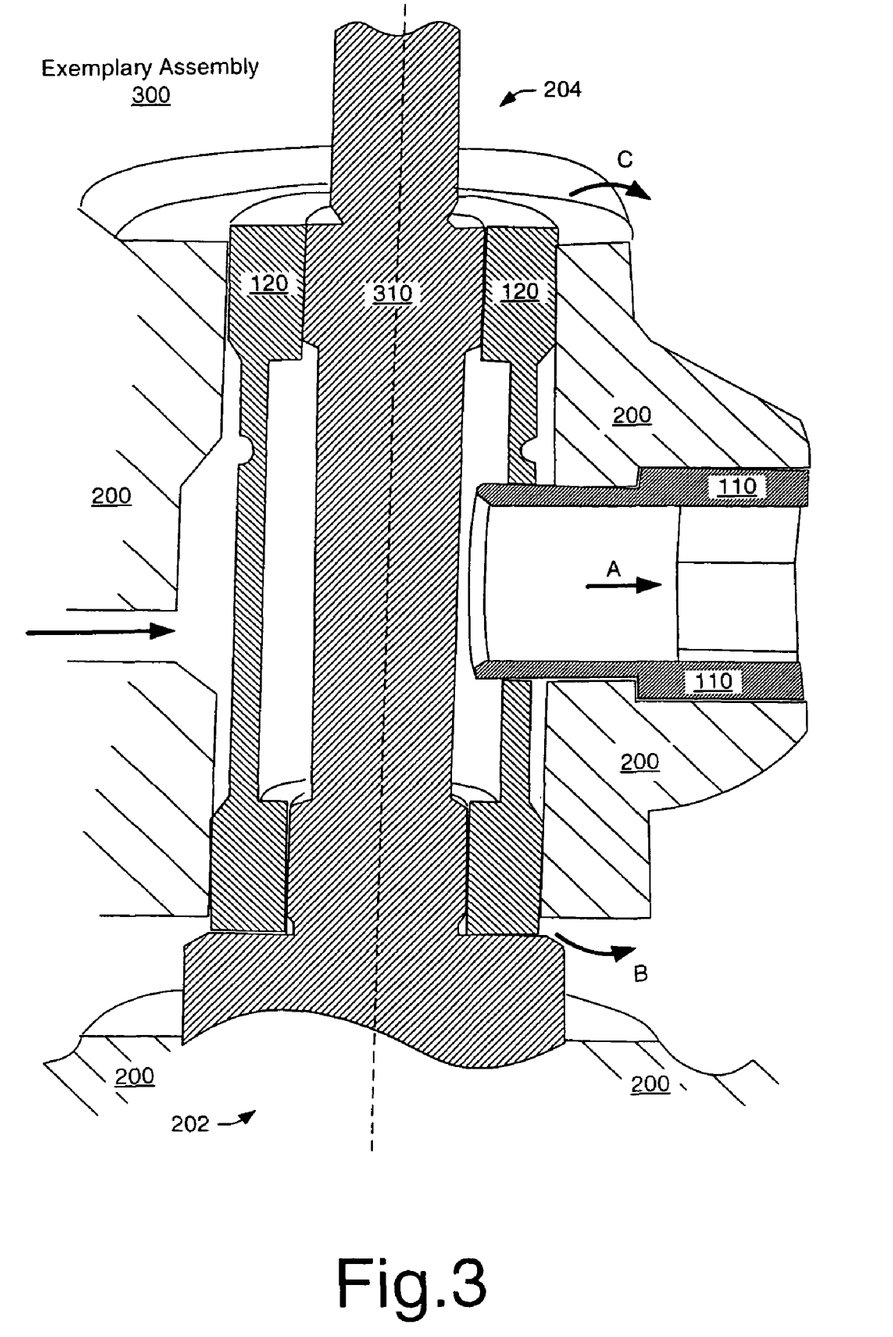
FIG. 3 is a cross-sectional view of an exemplary arrangement that includes the exemplary system of FIG. 1 and the exemplary center housing of FIG. 2.

FIG. 3 shows a cross-section of an exemplary assembly 300 that includes the exemplary pin 110, the exemplary bearing 120, the exemplary housing 200 and a shaft 310. The exemplary assembly 300 provides entry of lubricant to the bearing via the inlet 206 of the housing 200 and for three lubricant flow paths A, B, C to the exit 208 of the housing 200 (see, e.g., FIG. 2). Path A is via the aperture of the pin 110 while paths B and C are via film ends where the lubricant film exists between the shaft 310 and the bore surfaces 125, 125' of the bearing 120. The shaft 310, which extends through the bore of the bearing 120 may include a relieved portion that promotes lubricant flow between the shaft 310 and the bearing 120. The shaft 310 may be a single piece or a multipiece shaft.

Figure 4:
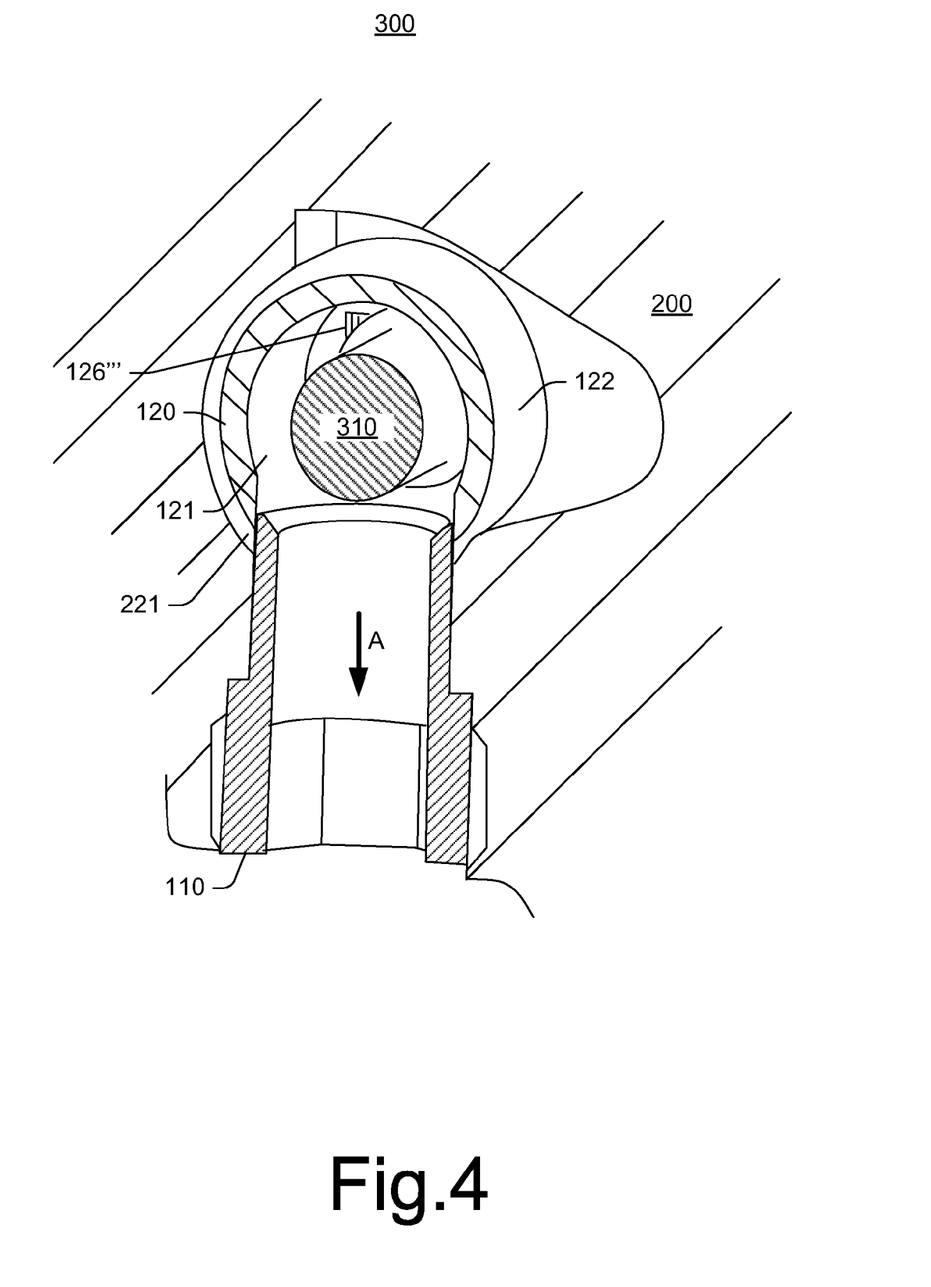
FIG. 4 is another cross-sectional view of the exemplary arrangement of FIG. 3.

FIG. 4 shows another cross-sectional view of the exemplary assembly 300 of FIG. 3. In this example, the relieved portion of the shaft 310 creates a substantially central annular chamber or inner chamber 121 in the bore of the bearing 120. Lubricant may flow into this chamber 121 and drain from the chamber 121 via the aperture of the locating pin 110. For example, lubricant may flow into the chamber 121 from an end of the film located between a bore surface 125 and a shaft surface or via an axial groove 126'''. Also shown in FIG. 4, is an outer chamber 221 formed by the housing 200 and at least in part by the outer central surface 122 of the bearing 120 that at least partially surrounds the outer central surface 122 of the bearing 120. Lubricant entering the housing 200 via the inlet 206 flows to this chamber 221 and to the various inlets 128-128''', 132-132'' of the bearing 120. As such, lubricant can only flow indirectly from the outer chamber 221 to the aperture of the locating pin 110 (e.g., via the inner chamber 121).

Figure 5A:
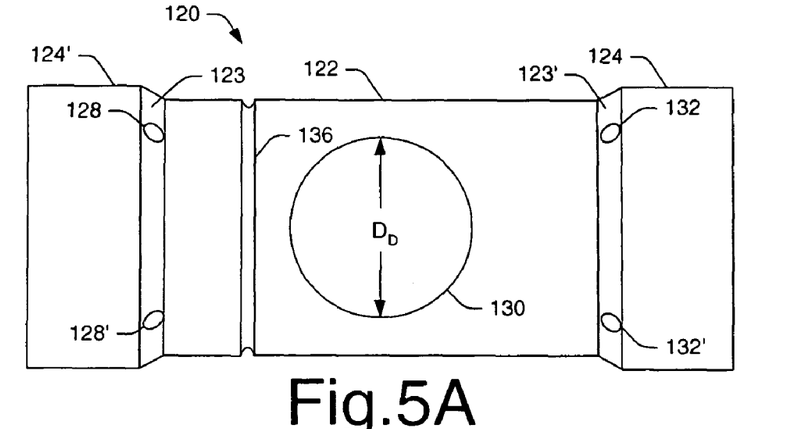
FIGS. 5A, 5B and 5C are a series of views of an exemplary bearing.
Figure 5B:
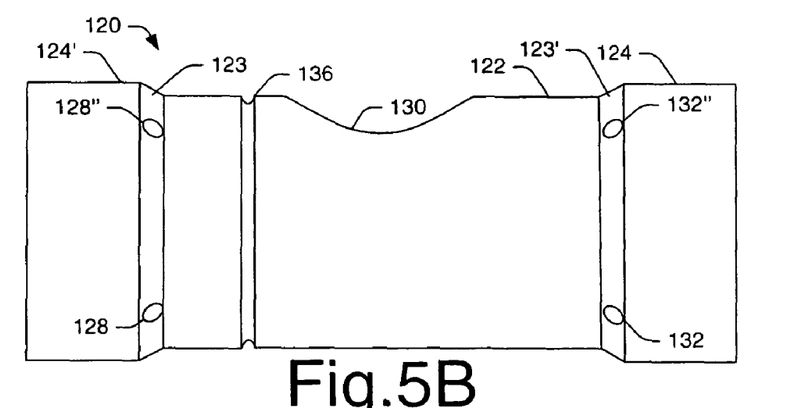
Figure 5C:
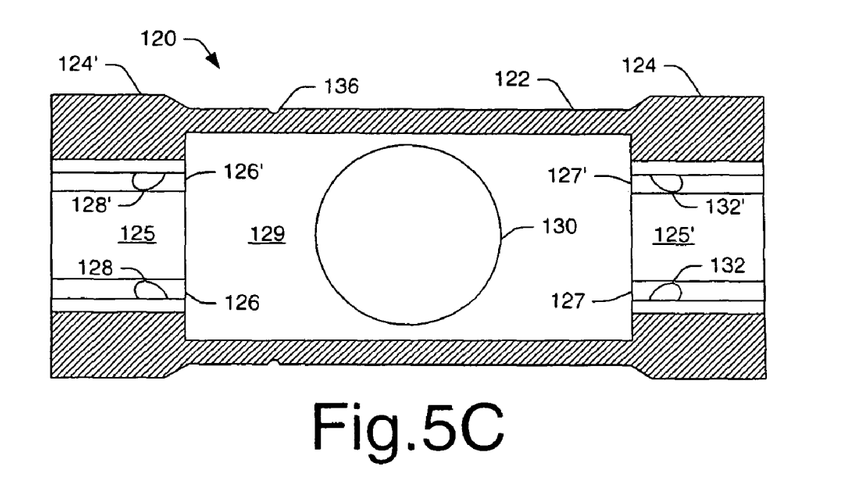

FIGS. 5A, 5B and 5C show three views of the exemplary bearing 120. A bottom view (FIG. 5A) of the bearing 120 indicates a dimension $D_O$ for the locating pin aperture 130. In this example, each beveled surface 123, 123' includes four inlets 128-128''', 132-132''', respectively. A side view (FIG. 5B) of the exemplary bearing 120 illustrates the locating pin aperture 130, which can receive the exemplary locating pin 110. A cross-sectional view (FIG. 5C) of the exemplary bearing 120 illustrates the junctures between the inlets 128, 128', 132, 132' and the respective axial grooves 128, 128', 127, 127'. These features allow for film formation between the bore surfaces 125, 125' and, for example, the shaft 310. The central portion of the bore includes a central surface 129 that can create a central bore chamber with an outer surface of a shaft. In various examples, the shaft 310 includes a relieved surface that acts to increase the volume of this bore chamber. Other examples may include a shaft of with a diameter substantially the same as a bore surface 125 or bore surface 125' diameter. In various examples, the bore surfaces 125, 125' have substantially similar diameters and the shaft 310 has slightly smaller diameters to thereby allow for formation of films between the bearing bore surfaces 125, 125' and respective outer surfaces of the shaft 310.

Figures 6A, 6B, 6C, 6D:
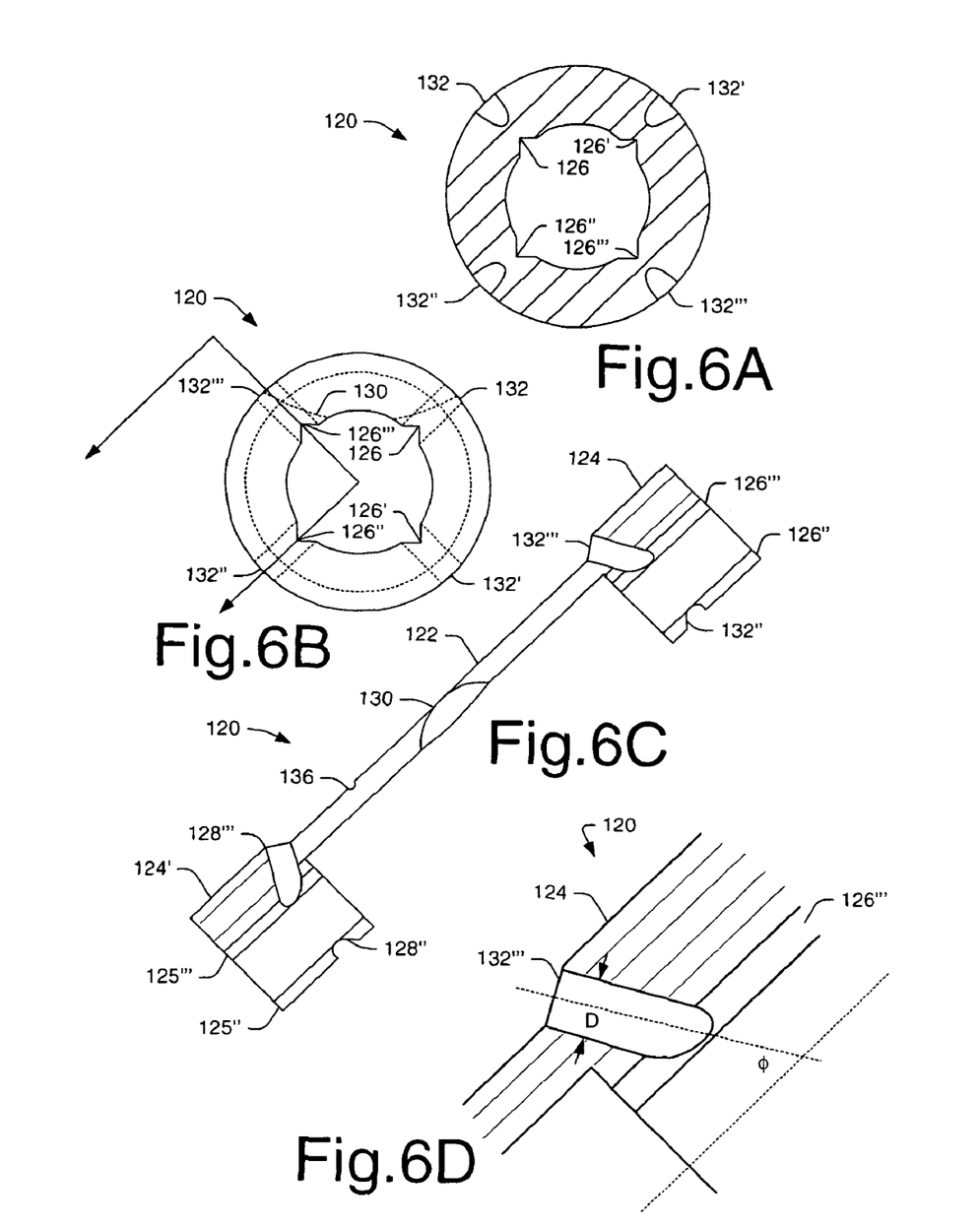
FIGS. 6A, 6B, 6C and 6D are a series of views of the exemplary bearing of FIGS. 5A, 5B and 5C.

FIGS. 6A, 6B, 6C and 6D show various views of an exemplary bearing 120. FIG. 6A shows cross-sectional view that includes inlets 132-132''' and axial grooves 132-132'''. The substantially parabolic outline of the inlets 132-132''' indicates that the inlets traverse the bearing wall at an angle. For example, a relative angle of approximately 20° to approximately 85° with respect to a central axis of the bearing and thereby the inlets may help to distribute lubricant axially outward with respect to a lubricant inlet of a center housing. As already mentioned, the inlets may be at an angle of approximately 30° with respect to a central axis of the bearing.

FIG. 6B shows an end view of the exemplary bearing 120 whereby dashed lines indicate approximate inlet paths from the beveled surface 123 to the axial grooves 126-126'''. The arrows represent the direction of the partial cross-sectional view of FIG. 6C of the exemplary bearing 120. FIG. 6D shows a magnified view of the inlet 132'' with respect to the axial groove 126'''. The inlet includes a dimension D that is substantially constant between the beveled surface 123' and the axial groove 126'''. Of course, the dimension or dimensions of an inlet may vary with respect to any dimension, for example, of a cylindrical coordinate system (r, Θ, z) where the (r, z) origin is along the central axis of the bearing. Similarly, the axial grooves may vary in dimension from those shown in the various examples. FIG. 6D also shows an angle φ between a centerline of the inlet 132''' and a line parallel to the central axis of the bearing 120.

Figure 7:
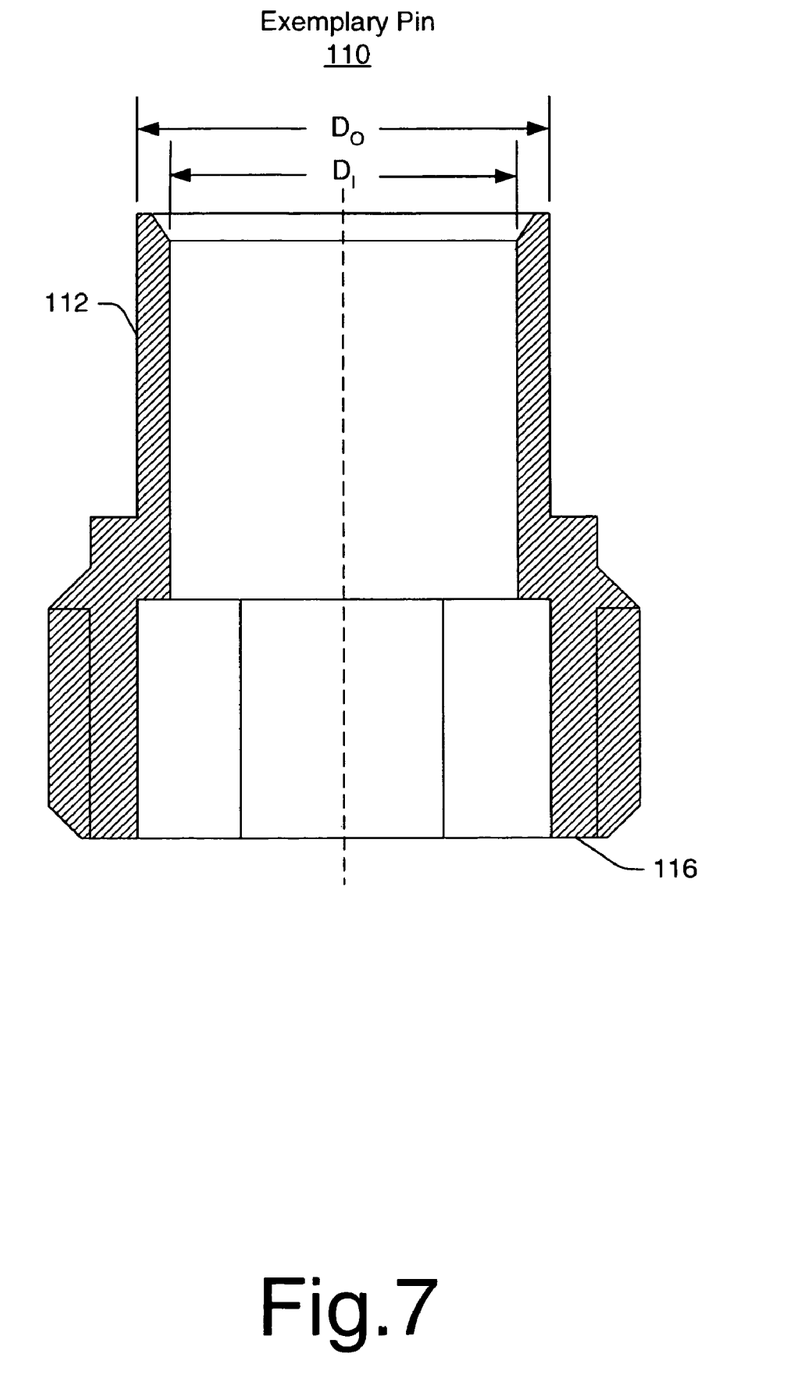
FIG. 7 is a cross-sectional view of an exemplary locating pin.

FIG. 7 shows the exemplary pin 110 having a shaft 112 and a head 116 and various dimensions, primarily associated with the shaft. As already mentioned, the head 116 may include one or more features that allow for rotation or positioning of the pin 110. An inner dimension $D_I$ allows for lubricant from the bearing bore chamber to exit the bearing. The outer dimension $D_O$ allows for inserting of the pin 110 into the locating pin aperture of the bearing. Threads or other feature(s) (e.g., bayonet, etc.) may be included to allow for cooperation between the pin 110 and a bearing or a housing.

As already mentioned, the single gallery feature acts to reduce production costs of the exemplary center housing. The exemplary bearings, locating pins, systems or assemblies described herein may use a center housing that includes more than a single gallery as a lubricant inlet.

The exemplary locating pin provides for lubricant drainage. Of course, other features (e.g., additional openings in the bearing wall) may provide for lubricant drainage. In general, drainage via the locating pin or other suitable mechanism is facilitated by gravity wherein alignment of the locating pin is substantially along the direction of gravitational acceleration. In comparison with conventional locating pins and bearings, the exemplary bearing and locating pin system may include a locating pin and a locating pin aperture of larger dimension.

An exemplary assembly can reduce "Windage" losses by providing a low pressure lubricant environment (e.g., on the order of atmospheric pressure) that thereby allows the rotating shaft to rotate more freely.

An exemplary bearing optionally has an enlarged inner bore cavity when compared to a conventional bearing as to increase the volume and allow for better lubricant mobility. As already mentioned, an exemplary shaft may include one or more reliefs to increase bore chamber volume.

An exemplary center housing optionally includes a larger locating pin aperture, for example, in a locating pin boss, when compared to a conventional center housing. As already explained, an exemplary locating pin includes a passage for draining lubricant. The cross-sectional flow area of the passage may be of a dimension such that the housing requires a larger aperture when compared to a locating pin without such a passage.

The invention claimed is:

1. A bearing and locating pin system for a turbocharger comprising:
    a locating pin including a shaft, a head and an aperture for drainage of lubricant; and
    a single piece bearing including two journal outer surfaces and a central outer surface positioned between the journal outer surfaces wherein the central outer surface has a first diameter that is smaller than the diameter of either journal outer surface, the bearing having a central axis and including an internal bore to receive a shaft extending between a compressor wheel and a turbine wheel to form an inner chamber between the shaft and the internal bore, the internal bore including internal journal surfaces for the received shaft wherein each of the internal journal surfaces comprises a plurality of axial grooves, the bearing including a locating pin aperture located at the central outer surface between axial ends of the bearing for engaging the locating pin to prevent rotation of the bearing within a bearing case bore and to prevent drainage of lubricant via the aperture of the locating pin directly from an outer chamber defined by the bearing, the locating pin and the bearing case bore, the bearing further including a plurality of lubricant inlets, each inlet extending between an outer surface of the bearing and one of the axial grooves at an angle non-orthogonal to the central axis wherein lubricant flow paths exist between the axial grooves and the inner chamber and between the inner chamber and the aperture for drainage of lubricant of the locating pin as engaged by the locating pin aperture of the bearing.

2. The bearing system of claim 1 wherein the bearing includes a beveled surfaces disposed between each journal surface and the central outer surface, wherein each of the inlets extends between one of the beveled surfaces and one of the axial grooves.

3. A bearing assembly for a turbocharger comprising:
    a locating pin including a passage for drainage of lubricant;
    a center housing including a bearing case bore and a boss with an aperture receiving the locating pin extending into the bearing case bore substantially centrally in the bore;
    a single piece bearing including two journal outer surfaces and a central outer surface positioned between the journal outer surfaces wherein the central outer surface has a first diameter that is smaller than the diameter of either journal outer surface, the bearing received in the bearing case bore to form an outer chamber defined by the bearing, the locating pin and the bearing case bore, the bearing having a central axis and including an internal bore to receive a shaft extending between a compressor wheel and a turbine wheel to form an inner chamber between the shaft and the internal bore, the internal bore including internal journal surfaces for the received shaft wherein each of the internal journal surfaces comprises a plurality of axial grooves that extend to the inner chamber, the bearing including a locating pin aperture located at the central outer surface between axial ends of the bearing and engaging the locating pin to prevent rotation of the bearing within the bearing case bore and to prevent drainage of lubricant from the outer chamber directly via the passage of the locating pin, the bearing further including a plurality of lubricant inlets, each inlet extending between an outer surface of the bearing and one of the axial grooves wherein lubricant flow paths exist between the axial grooves and the inner chamber and between the inner chamber and the passage for drainage of lubricant of the locating pin as engaged by the locating pin aperture of the bearing.

4. The bearing assembly of claim 3, wherein a beveled surface is disposed between the central outer surface and each respective journal outer surface.

5. The bearing assembly of claim 4 wherein each of the inlets extends between one of the beveled surfaces and one of the axial grooves.

6. The bearing assembly of claim 3 wherein each inlet is disposed at a non-orthogonal angle to the central axis of the bearing.

7. The bearing assembly of claim 6 wherein the inlet acts to direct lubricant towards the axial ends of the bearing.

8. The bearing assembly of claim 3 wherein the locating pin includes a socket for receipt of an instrument to rotate the locating pin.

9. The bearing assembly of claim 3 wherein the bearing includes eight axial grooves and eight inlets.

10. The bearing assembly of claim 3 wherein the inlets are disposed at non-orthogonal angles to the central axis of the bearing and wherein the locating pin is disposed substantially at an orthogonal angle to the central axis.

* * * * *